UNITED STATES PATENT OFFICE.

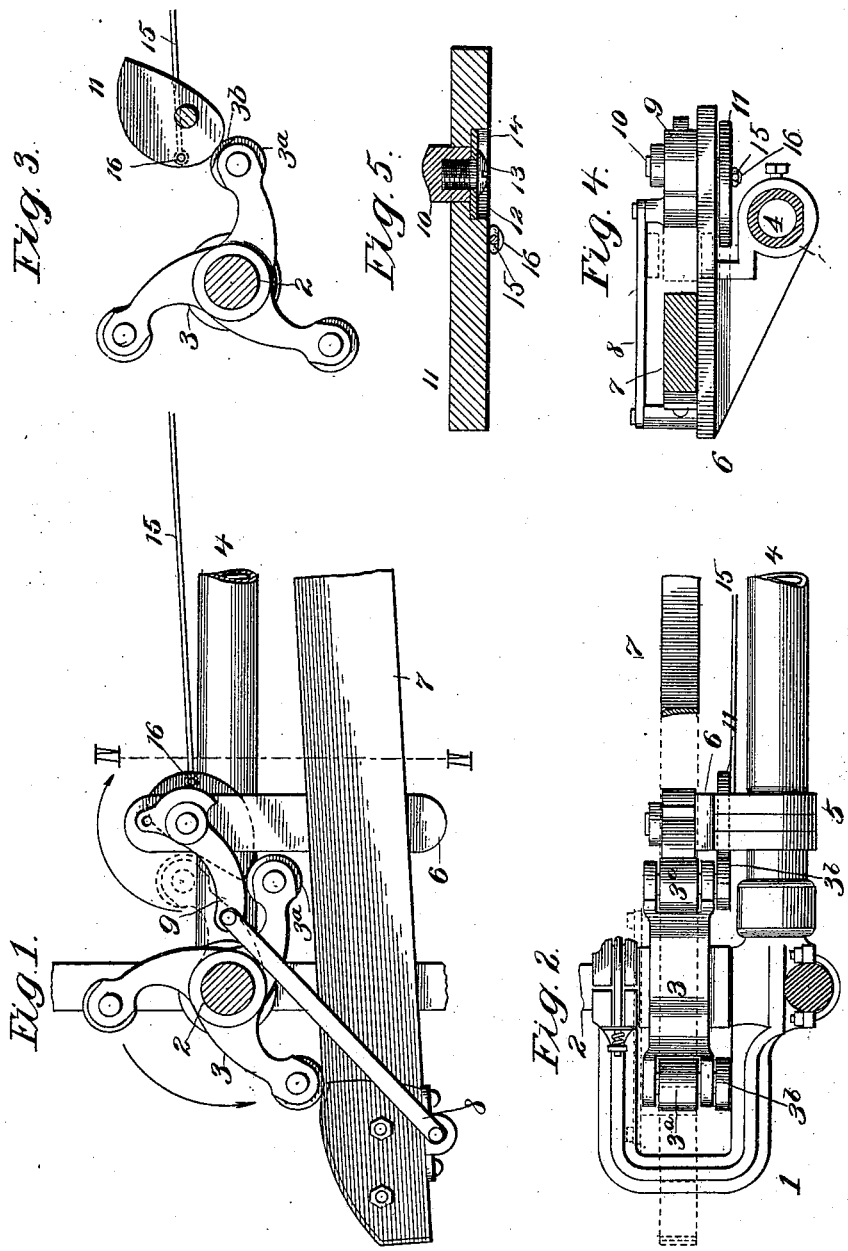

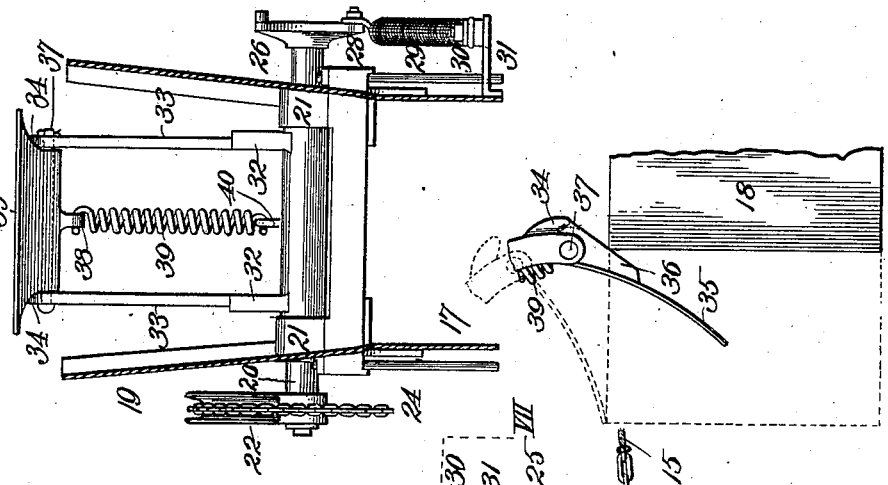
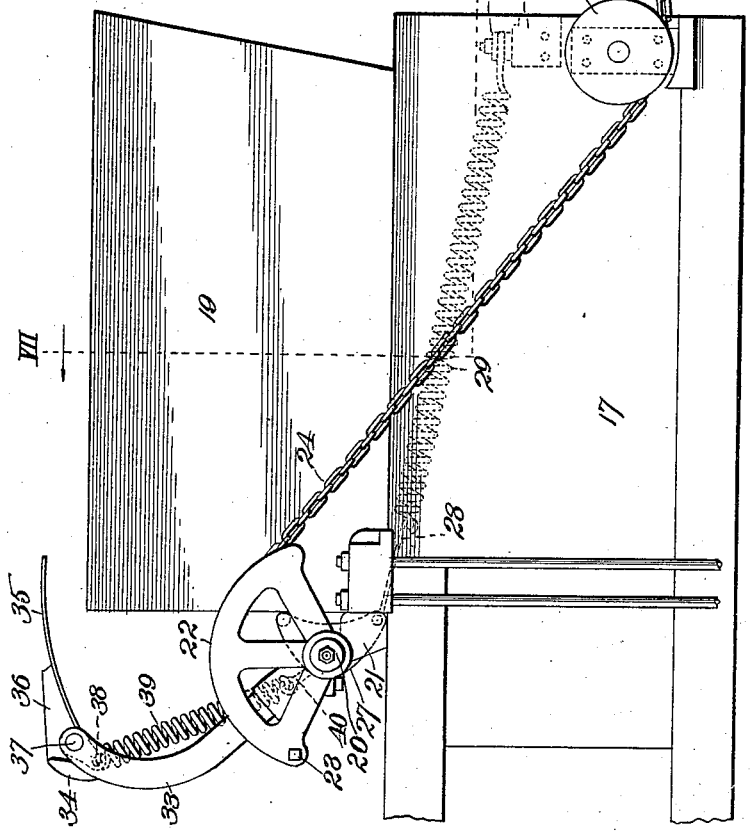
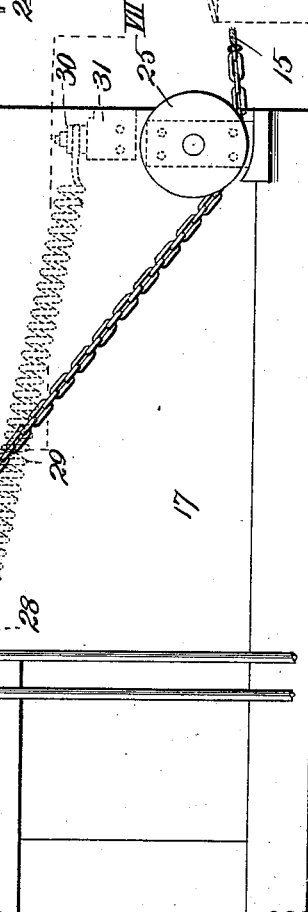

JOSIAH S. TUTTLE AND CHARLES L. COOKSON, OF KANSAS CITY, MISSOURI, ASSIGNORS TO TIMOTHY C. BRADLEY, OF KANSAS CITY, MISSOURI.

SELF-FEEDER FOR BALING-PRESSES.

SPECIFICATION forming part of Letters Patent No. 692,947, dated February 11, 1902.

Application filed October 8, 1901. Serial No. 77,954. (No model.)

*To all whom it may concern:*

Be it known that we, JOSIAH S. TUTTLE and CHARLES L. COOKSON, citizens of the United States, residing at Kansas City, in the county of Jackson and State of Missouri, have invented certain new and useful Improvements in Self-Feeders for Baling-Presses, of which the following is a specification.

Our invention relates to self-feeders for baling-presses; and our object is to produce a machine of this character which is positive and reliable in action and of simple, durable, and comparatively inexpensive construction.

To this end the invention consists in certain novel and peculiar features of construction and combinations of parts, as hereinafter described and claimed, and in order that it may be fully understood reference is to be had to the accompanying drawings, in which—

Figure 1 is a horizontal section of the power end of a press as equipped with feeder mechanism embodying our invention. Fig. 2 is a side view of the same. Fig. 3 is a detail view showing the feeder mechanism in a different position from that shown in Fig. 1. Fig. 4 is a section taken on line IV IV of Fig. 1. Fig. 5 is an enlarged section showing the cam forming a part of the feeder mechanism. Fig. 6 is a side view of the baling-chamber end of the press as equipped with the remainder of my feeder mechanism. Fig. 7 is a vertical section taken on the dotted line VII VII of Fig. 6, but showing the bracket at the front end of the baling-chamber and the spring attached thereto in elevation. Fig. 8 is a detail view showing the presser-foot in its depressed position and the plunger as about to strike the same and force it to the position shown in dotted lines.

In the said drawings, 1 designates what is generally known as the "gooseneck," wherein is journaled the power-shaft 2, to which the sweep (not shown) is attached. 3 designates the trip-lever, which may embrace any desired number of arms, preferably equipped with the usual antifriction-rollers 3ª and with supplemental rollers 3ᵇ, having their axes coincidental with rollers 3ª and preferably suitably journaled at the lower sides of the trip-lever arms, as shown in Fig. 2.

4 is the bed or reach, preferably in the form of a pipe and connected in any suitable manner to the gooseneck-casting 1 and adapted to be connected at its opposite end in the usual or any preferred manner to the baling-case end of the press.

5 is a casting secured to the bed contiguous to its front end, as shown, or in any other suitable manner and forming a shelf or support 6 for the usual reciprocatory pitman 7, which is caused to make its in or power stroke by the action of the trip-lever and is held in proper relation with said trip-lever by means of a link 8, pivotally connected at its opposite ends to the pitman and lever 9, arranged in the path of and adapted to be successively operated by the trip-lever arms, said lever 9 being journaled upon a stub-shaft 10, secured in and projecting above and below shelf portion 6 of casting 5, or said lever may be otherwise mounted, if desired.

To the construction thus far described we make no claim, as it is covered in Patent No. 654,800, issued July 31, 1900, to W. S. Livengood and G. Livengood.

Journaled upon the lower end of stub-shaft 10 and just below shelf 6 is a cam 11, the periphery of which grows gradually more remote from its axis from one side of the latter to the other, and said cam is preferably secured upon said stub-shaft by means of a washer 12 and screw-bolt 13, secured to the stub-shaft, said washer and bolt lying within the recess 14 in the lower side of the cam. Of course the cam may be otherwise supported, provided one face or the other is left perfectly free for the passage thereacross of a cable 15 or its equivalent swiveled or otherwise pivotally attached at its front end to the cam, as at 16, for a purpose which hereinafter appears.

17 designates the baling-case, of the usual or any preferred form, wherein reciprocates the customary plunger 18 of pitman 7. (See Fig. 8.)

19 is the hopper for the baling-case and preferably located above the same, the rear end of the hopper being open by preference in order that the feeder hereinafter referred to may operate therethrough. Extending transversely and horizontally of the press near the rear and lower corner of the hopper is a shaft 20, suitably journaled in bearings 21 and provided at one end with a peripherally-grooved drum-segment 22, having a cross-bolt 23 bridging the rear end of the groove for the purpose of reliably securing the rear and upper end of the chain or cable 24, the latter extending diagonally downward and forward and passing under the grooved pulley 25 for connection with the rear end of cable 15. Upon the opposite end of shaft 20 is secured a double lever or crank 26, one arm of said lever being formed with a pin 27, for a purpose which hereinafter appears. The opposite and normally lower end of the lever is connected by a pivot-link 28 to the stiff retractile spring 29, extending forwardly and bolted, as at 30, to the bracket 31, secured to the case.

32 designates a pair of arms projecting from shaft 20 between bearings 21, and secured rigidly to said arms are a pair of curved arms 33, formed near their upper ends and rear sides with rearwardly and laterally projecting shoulders or stops 34.

35 designates a presser-foot for forcing the charge of hay or material from the hopper into the baling-chamber, the same consisting, preferably, of the steel or equivalent plate backed or reinforced by a casting 36, pivoted, as at 37, to and between arms 33 and adapted to be limited as to movement in one direction by contact with shoulders or stops 34. Said casting is also formed with a central ear 38, projecting at the opposite side of the pivot from the presser-foot, and said ear is connected by a retractile spring 39 with the bolt 40, secured to shaft 20, for a purpose which hereinafter appears. With the parts arranged as shown in full lines, Figs. 1 and 6, it will be apparent that the operation of the trip-lever in the direction indicated by the arrow, Fig. 1, causes the power or in stroke of the pitman and the rotation of lever 9 and cam 11 in the direction indicated by the contiguous arrow, Fig. 1, the rollers 3ᵃ and 3ᵇ of the trip-arm in advance of that engaging the pitman respectively engaging said lever and cam. Before the pitman has advanced materially the trip-arm in engagement with lever 9 and cam 11 has moved from the position shown in full lines, Fig. 1, to the position shown in Fig. 3, and as a result has through the intermediate mechanism described swung the feeder with extreme rapidity from the position shown in Fig. 6 to the position shown in full lines, Fig. 8, and thus forced the charge of hay or other material from the hopper into the baling-chamber in advance of the plunger.

As the pivot or swivel point 16 of the cable, with the cam, passes beyond to the vertical plane of its axis and pulley 25 the spring 29, which obviously stretched under the rotation of shaft 20 in the depression of the feeder, retracts and reverses the operation of said shaft, thus effecting the instant reëlevation of the feeder out of the path of the advancing plunger and continued movement on the part of the cam, this movement in the same direction continuing until it is arrested by contact with the rear side of the trip-lever roller, which caused its first movement, as shown in dotted lines, Fig. 1. It will thus be seen that the cam rotates a complete circle periodically, the first half of the movement being imparted to it by the trip-lever and accompanied by the descent of the feeder and the last half being imparted to it by the retraction of spring 29 and accompanied by the reëlevation of the feeder. It will also be seen that the charge placed within the hopper is reliably and automatically forced into the baling-chamber ahead of the plunger, and, furthermore, that should the feeder stick in the baling-chamber from any cause whatever its pivotal connection with arms 33 enables it when struck by the plunger to double up to the position shown in dotted lines, Fig. 8, and thus avoid injury to itself or the plunger. In its doubling or pivotal action spring 39 is obviously stretched, its retraction immediately following the withdrawal of the plunger or the elevation of feeder-arms 33, this retraction of course swinging the feeder upward until casting 36 strikes the shoulders or stops 34 of the arms.

From the above description it will be apparent that we have produced a self-feeder for baling-presses which embodies the features of advantage enumerated as desirable in the statement of invention and which obviously may be varied in some particulars without departing from the principle of construction involved.

Having thus described the invention, what we claim as new, and desire to secure by Letters Patent, is—

1. The combination with a baling-press having a trip-lever, of a feeder suitably supported contiguous to the baling-case, a revoluble cam suitably journaled at the power end of the machine, a connection between the cam and the feeder whereby movement imparted to the former by the trip-lever, is accompanied by the advance or feeding movement of the feeder, and means for synchronously restoring the feeder to its original position and causing the cam to continue its movement until it has described a complete circle, substantially as described.

2. The combination with a baling-press having a trip-lever, of a feeder suitably supported contiguous to the baling-case, a revoluble cam suitably journaled at the power end of the machine, a connection between the cam and the feeder whereby movement imparted to the former by the trip-lever, is accompanied by the advance or feeding movement of the feeder, and a spring for synchronously restoring the feeder to its original position and causing the cam to continue its movement until it has described a complete circle, substantially as described.

3. The combination with a baling-press having a trip-lever, of a feeder suitably supported contiguous to the baling-case, a revoluble cam suitably journaled at the power end of the machine, a flexible connection suitably guided between the cam and the feeder whereby movement imparted to the former by the trip-lever, is accompanied by the advance or feeding movement of the feeder, and means for synchronously restoring the feeder to its original position and causing the cam to continue its movement until it has described a complete circle, substantially as described.

4. The combination with a baling-press having its trip-lever provided with a roller, of a movable feeder, supported contiguous to the baling-chamber, a rotary cam journaled in the path of said supplemental trip-lever roller, a connection between the feeder and the cam, the front end of the connection being pivoted or swiveled to the cam so as to swing across the face thereof, and means for yieldingly resisting the movement imparted to the cam and feeder by the trip-lever roller and for restoring said parts to their original position after the trip-lever roller has passed, substantially as described.

5. The combination with a baling-press having a trip-lever, of a self-feeder embodying swinging arms, a presser-foot pivoted to said arms and projecting forwardly therefrom, and a spring holding said presser-foot at a suitable angle, a revoluble cam suitably journaled at the power end of the machine, a connection between the cam and the feeder whereby movement imparted to the former by the trip-lever is accompanied by the advance or feeding movement of the feeder, and means for synchronously restoring the feeder to its original position and causing the cam to continue its movement until it has described a complete circle, substantially as described.

6. The combination with a baling-press having a trip-lever of a self-feeder embodying swinging arms, provided with forwardly-disposed shoulders, a presser-foot provided with a reinforce plate or casting, and a spring normally holding said casting against said shoulders, a cam suitably journaled at the power end of the machine, a connection between the cam and feeder whereby movement imparted to the former by the trip-lever is accompanied by the advance or feeding movement of the feeder, and means for synchronously restoring the feeder to its original position and causing the cam to continue its movement until it has described a complete circle, substantially as described.

7. The combination with a baling-press having a trip-lever of a self-feeder, comprising a transverse shaft suitably journaled at the rear end of the feed-opening, a segmental drum and lever on opposite ends of the same, a retractile spring connecting said lever with a fixed part of the press, arms projecting from said shaft and provided with forwardly-disposed shoulders, and a presser-foot provided with a reinforce-plate, pivoted to said arms, a retractile spring connecting the shaft with said reinforce-plate so as to hold the latter against said shoulders, a revoluble cam in the path of the trip-lever, a pulley journaled upon the case, and a flexible connection depressed by said pulley and attached at its opposite ends to said drum and said cam, and adapted to sweep across the face of the latter, substantially as described.

8. The combination with a baling-press, having a trip-lever, of a self-feeder, comprising a transverse shaft suitably journaled, arms projecting from said shaft and provided with forwardly-disposed shoulders, a presser-foot pivoted to said arms, a spring forming a part of the feeder merhanism and holding the presser-foot normally against said shoulders, means actuated by the trip-lever for operating said shaft and thereby effecting the descent of the presser-foot into the baling-chamber, and means for reversing the operation of said shaft after the overcoming pressure of the trip-lever is removed and thereby reëlevating the presser-foot, substantially as described.

In testimony whereof we affix our signatures in the presence of two witnesses.

JOSIAH S. TUTTLE.
CHARLES L. COOKSON.

Witnesses:
H. C. RODGERS,
G. Y. THORPE.